United States Patent

[11] 3,630,411

| [72] | Inventors | Clarence V. Petty<br>Box 272;<br>Alden G. Weakly, Box 264, both of<br>Newport, N.Y. 13416 |
|---|---|---|
| [21] | Appl. No. | 856,124 |
| [22] | Filed | Sept. 8, 1969 |
| [45] | Patented | Dec. 28, 1971 |

[54] SEED DISPENSER AND METHOD
9 Claims, 4 Drawing Figs.

[52] U.S. Cl. .................................................... 221/264,
221/278
[51] Int. Cl. ...................................................... G07f 7/00
[50] Field of Search .......................................... 221/264,
278; 222/366, 194, 193

[56] References Cited
UNITED STATES PATENTS

| 2,479,534 | 8/1949 | Bergh ............................ | 221/278 |
| 558,448 | 4/1896 | Brown .......................... | 222/366 X |
| 2,403,299 | 7/1946 | Pickin .......................... | 222/366 X |

FOREIGN PATENTS

| 1,115,241 | 5/1968 | Great Britain ................ | 222/366 |

Primary Examiner—M. Henson Wood, Jr.
Assistant Examiner—Edwin D. Grant
Attorney—William S. Thompson ABSTRACT: A device, operative in response to a pneumatic squeeze bulb, to select a discreet number of seeds and eject them under influence of a pneumatic ejection pressure. Also a sequential method of pneumatically positioning and ejecting a seed.

Patented Dec. 28, 1971 3,630,411

C.V. PETTY
A.G. WEAKLY
INVENTOR.

SEED DISPENSER AND METHOD

BACKGROUND OF THE INVENTION

It is a desired objective to dispense a discrete number of seeds, or other particulate matter, for example one, two or three, at a given location depending on the seed type and probable germination yield. Very fine or small seeds such as the petunia seed cannot easily be segregated by hand or finger manipulation and as a result, generally, greenhouse operators and florists undertake a two-step process of first growing seedlings in a random and thickly seeded bed and later, after shoots have emerged, to separate and transplant them to final beds having properly spaced and adequate growing room for each plant. Much of the seed is lost in the first overly thick planting and, of course, the separation and transplanting process requires time-consuming manual labor. Seed dispensers in the prior art that are known to us suffer from the disadvantage that they are either unable to handle fine seeds reliably, or are incapable of ejecting only a selected discreet number of seeds which is desired to enable proper plant spacing at the first planting.

SUMMARY OF THE INVENTION

To obtain the desired objectives, we have devised a seed dispenser and/or ejector which may be a simple hand-held device operated with a single squeeze bulb manipulation to eject reliably a seed (or discrete number thereof). To accomplish the objective, the mechanism selects a discrete number of seeds when in a nonejecting position. As the mechanism is actuated, several actions occur in rapid sequence to first isolate the selected seeds from bulk supply, to advance them to an eject position, and finally to eject the seeds under the influence of a pneumatic ejection pressure. The device then automatically resets itself for the next ejection manipulation when the squeeze bulb is released. Thus by discrete selecting and forcibly ejecting a selected number of seeds, it is possible to conserve seeds and, possibly, in certain situations, eliminate a rather conventional and laborious transplanting step.

DETAILED DESCRIPTION OF INVENTION

Figure 1:
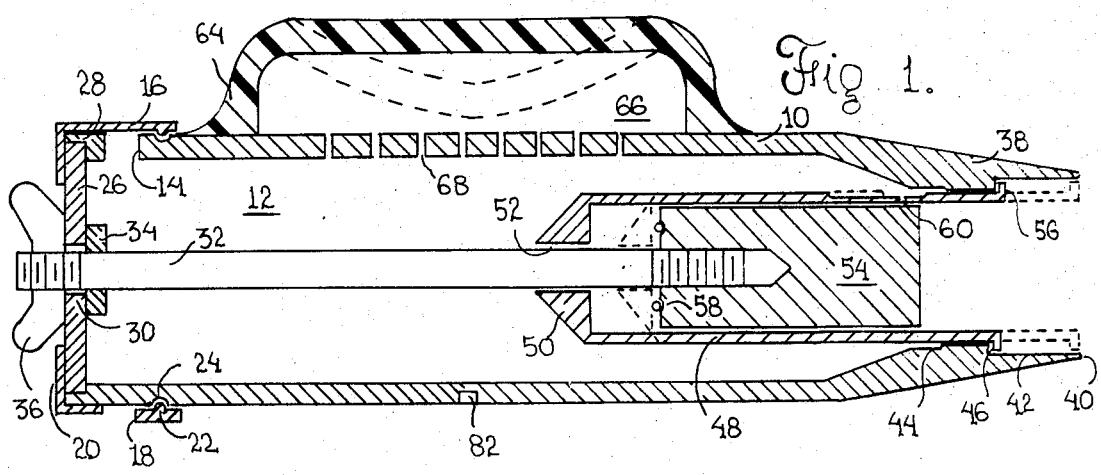
FIG. 1 is a cross-sectional view of a preferred embodiment of a seed dispenser employing the feature of my invention.
Figure 2:
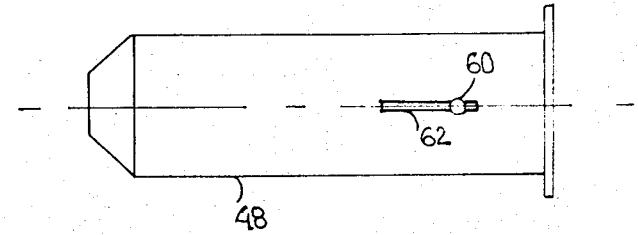
FIG. 2 is a detail view of a seed transporting sleeve forming a part of the FIG. 1 device.

Referring particularly to FIG. 1, the seed dispenser has an elongated tubular or barrel member 10 which forms the principal housing of the device, defining an interior seed containing chamber 12. A fill opening 14 is formed in the sidewall of barrel member 10 and is covered by the cylindrical cap 16 which has an opening 18 which may be rotated by finger manipulation in registry with fill opening 14 permitting the introduction of a seed charge. Cap 16 is located axially on the barrel by circumferential flange 20 and bead 22, the latter of which rides in a continuous circular groove 24 formed in the outer surface of tubular member 10. A disc-shaped end cap 26 is pressed in a recessed peripheral groove 28 formed in the end of tubular housing member 10 to form an enclosure wall. End cap 26 has a central aperture 30 through which is passed a rod 32 which is supported by the cap 26 by virtue of clamping action imposed by flange 34 and wing nut 36 attached to the rod. It is noted, for purposes which will later appear clear, some clearance is provided between aperture 30 and rod 32 to permit centering of rod 32 before the wing nut is fully tightened.

The rightward end 38 of tubular housing member 10, as viewed in the drawings, has a relatively large opening 40 formed therein which hereafter may be referred to as the seed ejecting end. Projecting inwardly from opening 40 is a first cylindrical surface or opening 42 and a second smaller and adjacent cylindrical surface or opening 44 which form a shoulder or flange 46 at their juncture. A tubular seed carrying sleeve 48 is supported at one end on the rod 32 by bearing flange 50 having an opening 52 concentric with and in sliding contact with rod 32. A large diameter cylindrical bearing block member 54 is threadedly supported on the right end of rod 32 and forms a sliding support surface for sleeve 48. Sleeve 48 has a flange 56 formed on its rightmost end which abuts shoulder 46 to define the leftmost position of the sliding sleeve 48. The rightmost travel of sliding sleeve 48 is established by the spacing between block 54 and bearing flange 50. An O-ring or grommet 58 is inserted in the end face of block 54. A transverse opening 60 of small dimension of sufficient size to admit a desired seed type is formed in the sidewall of sleeve 48. In the retracted position of sleeve 48, illustrated, opening 60 is blocked by bearing block 54 and has reasonable freedom at the outer surface of sleeve 48 so as to freely contact stored seeds. A groove 62 is also formed in sleeve 48 running longitudinally thereof and connecting with seed opening 60 to form a seed feeding trough. Our seed ejecting device completed by a deformable squeeze bulb or cup-shaped elastomeric member 64 which may be glued to the exterior of the tubular housing 10 forming a deformable air chamber 66 which pneumatically communicates with seed storage chamber 12 through a series of perforations 68. The perforations should preferably be smaller than a seed dimension or a small mesh screen may be provided to keep seeds from air chamber 66.

OPERATION

First in sequence, our seed ejector device is filled with a charge of the desired seed type by rotating cylindrical cap 16 so that holes 18 and 14 are aligned. After the desired seed charge is introduced, cap 16 is twisted to a closed position and the parts of the mechanism in general assume the illustrated positions. The seed ejector is then grasped in the hand of the user with the ejecting end pointed downwardly and closely adjacent to the desired point of seed placement. By gravity the seed charge in chamber 12 collects around and adjacent sleeve 48 at the vicinity of seed ejecting hole 60. Due to the dimensioning hole 60, one seed with lodge in the hole and be retained therein by block 54. This selecting action is aided by the groove 62 which tends to line up seeds for subsequent drop into opening 60. As the operator then squeezes bulb member 64, pneumatic pressure in chamber 12 increases and applies a pressure unbalance on sleeve 48 which advances the sleeve to the right, as illustrated, or downwardly, as it would be held. As sleeve advances, opening 60 will first pass into the region of cylindrical opening 44 which because of close sliding clearance with sleeve 48 which is smaller than the seed size will isolate opening 60 from the bulk seed charge and hence also isolate the single seed in opening 60. Next in sequence, opening 60 will pass the end of support block 54 and the singular trapped seed will be ejected or blown clear from opening 60 under the positive influence of pneumatic pressure. The sleeve 48 continues to advance until sleeve 48 abuts block 54 and compresses O-ring seal 58, which reduces air leakage. As the operator releases bulb 64, a slight vacuum will exist in chamber 12 as the air supply has been depleted on the previous half cycle due to outward leakage. This vacuum develops a reverse pressure unbalance on sleeve 48 causing the sleeve to be repositioned in the illustrated position wherein a new seed drops into hole 60 arming the device for a new ejection cycle. Vacuum return of sleeve 48 eliminates the necessity of a biasing return spring which chews or destroys seeds.

Recognizing that certain seeds will have a low expected germination yield under the predicted growing conditions, it may be desired to eject two or three, etc. seeds on one location to insure at least one plant at each location. This result may be readily accomplished by providing a second or third seed opening, similar to opening 60, through sleeve 48 in the same transverse plane as opening 60 at circumferentially spaced locations. It is also anticipated our seed ejector would have a kit form with a series of insertable sleeves 48 provided having seed ejecting holes sized for a variety of desired seed types.

Figure 3:
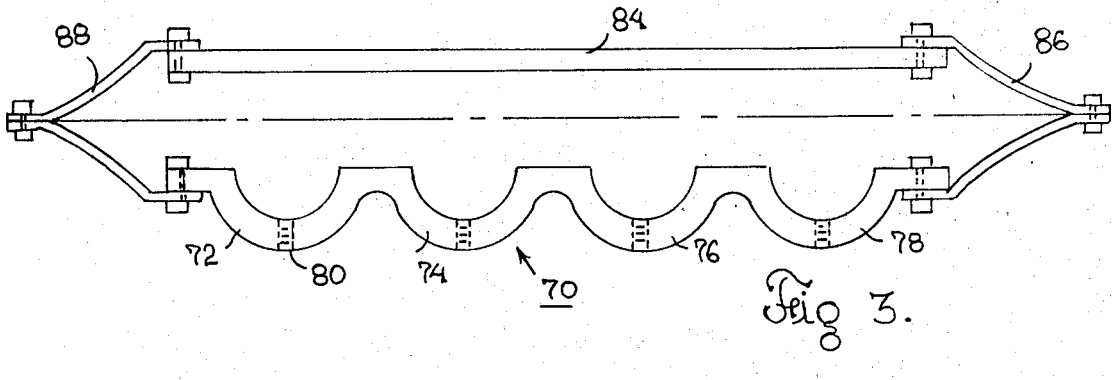
FIGS. 3 and 4 illustrate a harness arrangement for obtaining ganged operation of several seed dispensers, if desired.
Figure 4:
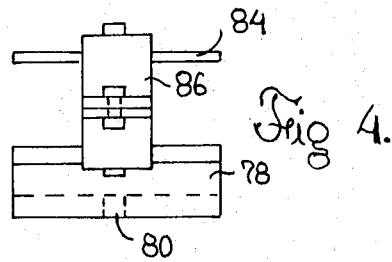

Referring to FIGS. 3 and 4, a harness is illustrated for connecting multiple seed ejectors for simultaneous multiple row planting. The harness consists of a bracket 70 having a series of four adjacent semicircular holding members 72, 74, 76 and 78 into which the tubular member 10 of four seed ejector devices are adapted to be fitted. A treaded opening 80 is provided which is adapted to receive a connecting screw which may be screwed into the blind tap hole 82 (illustrated in FIG. 1) on the side of the seed ejector opposite squeeze bulb 64. Bar 84 is connected by rivets through leaf springs 86 and 88 to the mounting bracket 70. Movement of bar 84 would simultaneously compress the squeeze bulbs of all seed ejectors mounted in the harness.

Other arrangements can, of course, be made without departing from the invention as claimed.

We claim:

1. A seed dispenser comprising, in combination:
   a generally tubular housing member having a seed ejection opening formed at one end;
   a movable member for limited slidable movement within said tubular housing member and along the axis thereof; said movable sleeve member having an open end extending into said seed ejection opening and a substantially closed end within said tubular housing;
   an opening formed transversely through the movable sleeve member proximate said open end;
   pneumatic means operative to reciprocate said movable sleeve member between its limits of travel and alternately position said opening in a seed receiving and a seed ejecting position; and
   blocking means operative to block one side of said opening when the sleeve member is in the second receiving position and unblocking said opening when the sleeve member is in the seed ejecting position.

2. A seed dispenser as claimed in claim 1 wherein said pneumatic means is further operative to forcibly eject a seed from said transverse opening when the movable sleeve is in the seed ejecting position.

3. A seed dispenser as claimed in claim 1 wherein said pneumatic means is an elastomeric deformable chamber operative when depressed to apply superatmospheric pressure to one side of the substantially closed end wall of said movable sleeve member.

4. A seed dispenser as claimed in claim 1 wherein said blocking means also comprises a bearing means within said movable sleeve member for slidably supporting said sleeve member.

5. A seed dispenser as claimed in claim 1 including a region of close clearance between said movable sleeve and said housing axially spaced so that said transverse opening passes within said close clearance region when the sleeve is advanced to the seed ejection position thereby isolating the opening through a clearance space smaller than a seed dimension.

6. A seed dispenser as claimed in claim 1 including groove means formed axially along the outer surface of said movable sleeve intercepting said opening to form a seed feed trough for said opening.

7. A seed dispenser as claimed in claim 1 including harness means for mounting a plurality of seed dispensers having spring mounted bar means adapted to actuate all of the pneumatic means simultaneously of a plurality of mounted seed dispensers.

8. A seed dispenser as claimed in claim 1 including a selectably closable access opening formed in said tubular housing member to permit the introduction of a bulb seed charge within the tubular housing member.

9. Method for dispensing a discrete seed quantity comprising the steps of:
   selecting a discrete number of seeds from a bulk seed supply in an opening located adjacent to said bulk seed supply and sized to accept the desired seed quantity;
   pneumatically transporting the seed containing opening to a location having a close clearance region of small dimension blocking seeds from the bulk supply; and
   ejecting pneumatically the discrete selected seeds from the opening by utilizing exhausting air from the pneumatic seed transportation means.

* * * * *